W. J. BURBERY.
FASTENER.
APPLICATION FILED SEPT. 20, 1919.
1,428,358.  Patented Sept. 5, 1922.
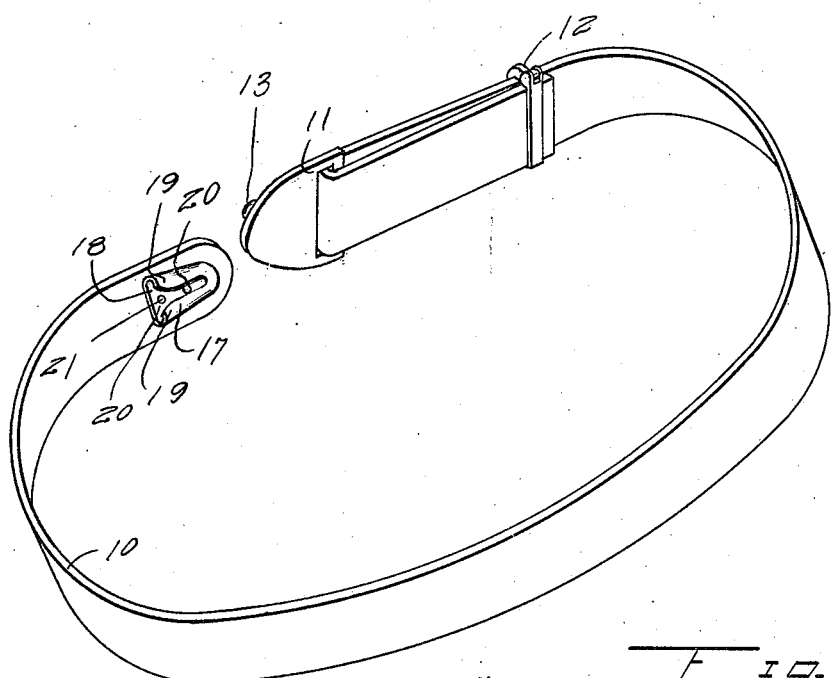
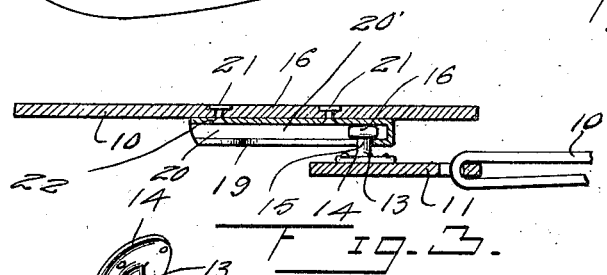
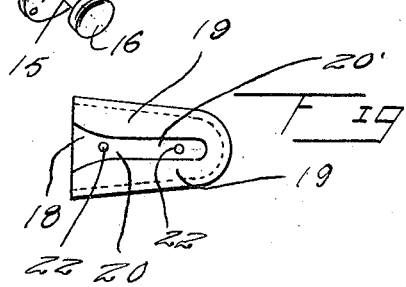
Inventor
W. J. Burbery Patented Sept. 5, 1922.

1,428,358

UNITED STATES PATENT OFFICE.

WALTER J. BURBERY, OF LOS ANGELES, CALIFORNIA.

FASTENER.

Application filed September 20, 1919. Serial No. 325,055.

*To all whom it may concern:*

Be it known that I, WALTER J. BURBERY, a citizen of the United States, residing at Edendale, Los Angeles, in the county of Los Angeles and State of California, have invented certain new and useful Improvements in Fasteners; and I do hereby declare the following to be a full, clear, and exact description of the invention, such as will enable others skilled in the art to which it appertains to make and use the same.

This invention relates to an improved fastener for use in releasably connecting two articles and may be used in connection with a belt as illustrated or for connecting other articles such for instance as the front flap of a tent, for holding the side curtains of an automobile in place and in other uses where it is desired to releasably connect one article with another. This fastener is so constructed that the stud or button may be easily and quickly inserted in the socket and securely but releasably retained in the neck of the socket thus preventing the button from slipping out of place but at the same time permitting it to be easily disconnected when desired.

This fastener is illustrated in use in connection with a belt in the accompanying drawings wherein:

Figure 1 is a perspective view of a belt having the free end portions provided with the improved connecting means.

Figure 2 is a longitudinal sectional view through the end portion of the belt with the stud engaged in the socket.

Figure 3 is a perspective view of the stud.

Figure 4 is a plan view of the socket.

This improved fastener is shown used in connection with a belt 10, one end portion of which is passed through a plate 11 and carried back and releasably secured through the medium of a clamping buckle 12 of a conventional lever type. It will thus be seen that when in use the belt may be adjusted to the proper size and then put in place and passed through supporting straps at the waistband of the trousers, the supporting loops of the trousers being positioned either outside or inside of the waistband. A stud is connected with the plate 11 and is indicated in general by the numeral 13. This stud is provided with a base 14 which is secured to the plate 11 and carries a neck 15 at the end of which is provided an enlarged head 16 which holds the stud in the socket as will be hereinafter brought out.

The socket which is indicated in general by the numeral 17 in Figure 1 is connected with one end portion of the belt and will engage with the stud as shown in Figure 2. This socket is preferably formed of sheet metal stamped and pressed to assume the configuration disclosed. This socket is provided with a base plate 18 provided with flanges 19 which converge to a point intermediate their length and are then carried substantially parallel and brought together thus providing a pocket 20 within the socket, the pocket having a reduced extension or neck 20′. This socket will be securely held in engagement with the belt by means of fasteners 21 which pass through openings 22. It will be noted that when the belt is in use and the stud placed in the socket as shown in Figure 2, the neck of the stud will fit into the neck 20′ of the socket 20 and the head 16 will engage the side flanges of the socket thus retaining the stud in engagement with the socket. The belt will be so adjusted that it will be held under a slight tension when the end portions are connected and therefore there will be no danger of the stud slipping out of engagement with the socket. A very efficient fastener has therefore been provided for releasably connecting the end portions of a belt.

What is claimed is:

A separable fastener having a plate provided with a flange at one end and the side edges and turned over the plate leaving a slot and a recess to which the slot leads, a second plate, a shank extending from the second plate to enter said slot, a head on the shank for disposition in the recess, the walls of said slot at the entrance thereof being flared to facilitate application of the shank, and the sides of said first section converging toward the closed end thereof.

In testimony whereof I affix my signature in presence of two witnesses.

WALTER J. BURBERY.

Witnesses:
HANNAH BURBERY,
THOMAS D. OYLEY.